United States Patent [19]

Challener, IV

[11] Patent Number: 5,414,678
[45] Date of Patent: May 9, 1995

[54] MAGNETO-OPTIC RECORDING MEDIUM HAVING TWO RECORDING LAYERS, AND DRIVE FOR SAME

[75] Inventor: William A. Challener, IV, Grant Township, Washington County, Minn.

[73] Assignee: Minnesota Mining and Manufacturing Company, St. Paul, Minn.

[21] Appl. No.: 300,311

[22] Filed: Sep. 2, 1994

[51] Int. Cl.$^6$ .................................. G11B 13/04
[52] U.S. Cl. ........................ 369/13; 369/110; 369/275.2
[58] Field of Search .............. 369/13, 14, 110, 275.2, 369/275.3; 360/59, 114; 365/122; 428/694 ML, 694 MM, 694 IL, 694 IS

[56] References Cited

U.S. PATENT DOCUMENTS

| | | | |
|---|---|---|---|
| 5,258,237 | 11/1993 | Nakaki et al. | 369/13 |
| 5,270,994 | 12/1993 | Nakayama et al. | 369/13 |
| 5,282,095 | 1/1994 | Spruit et al. | 369/13 |
| 5,325,343 | 6/1994 | Ohtsuki | 369/13 |
| 5,359,579 | 10/1994 | Karube | 369/13 |
| 5,369,628 | 11/1994 | Yoshimoto et al. | 369/13 |

FOREIGN PATENT DOCUMENTS 0401041 12/1990 European Pat. Off. .
4204568A1 9/1992 Germany .

OTHER PUBLICATIONS

"Jones matrix analysis of magnetooptical media and read-back systems," Challener et al., *Applied Optics*, vol. 26, No. 18, 15 Sep. 1987, pp. 3974-3980.
"Refractive indices of reactive magnetooptical thin films," Challener et al., *Applied Optics*, vol. 29, No. 20, 10 Jul. 1990, pp. 3040-3045.
"Readout Characteristics in Double Storgae Layer Magneto-Optical Disk Memories," *IEEE Transactions on Magnetics*, vol. Mag-22, No. 5, Sep. 1986, pp. 934-936.
"Multilayered Garnet Films for High Density Magneto-Optic Memory," Itoh et al., *IEEE Translation Journal of Magnetics in Japan*, vol. TJMJ-2, No. 12, Dec. 1987, pp. 1091-1094.

*Primary Examiner*—Georgia Y. Epps
*Assistant Examiner*—Tan Dinh
*Attorney, Agent, or Firm*—Gary L. Griswold; Walter N. Kirn; Eric D. Levinson

[57] ABSTRACT

A magneto-optic recording medium having two magneto-optic recording layers having different Curie temperatures. The magneto-optic layers must be capable of existing in two different magnetic states: a first magnetic state in which both magneto-optic layers are magnetized in the same direction and second state in which the layers are magnetized in opposite directions. The phase, $\phi$, of the magneto-optic film stack is defined as the arctangent of the magneto-optic ellipticity, $\epsilon$, divided by the magneto-optic rotation, $\theta$; i.e., $=\tan^{-1}(\epsilon/\theta)$ for each magnetic state. The phase difference, $\Delta\phi$, for the two states should be about 90°. The invention also includes a magneto-optic drive for use with the medium described above.

13 Claims, 1 Drawing Sheet

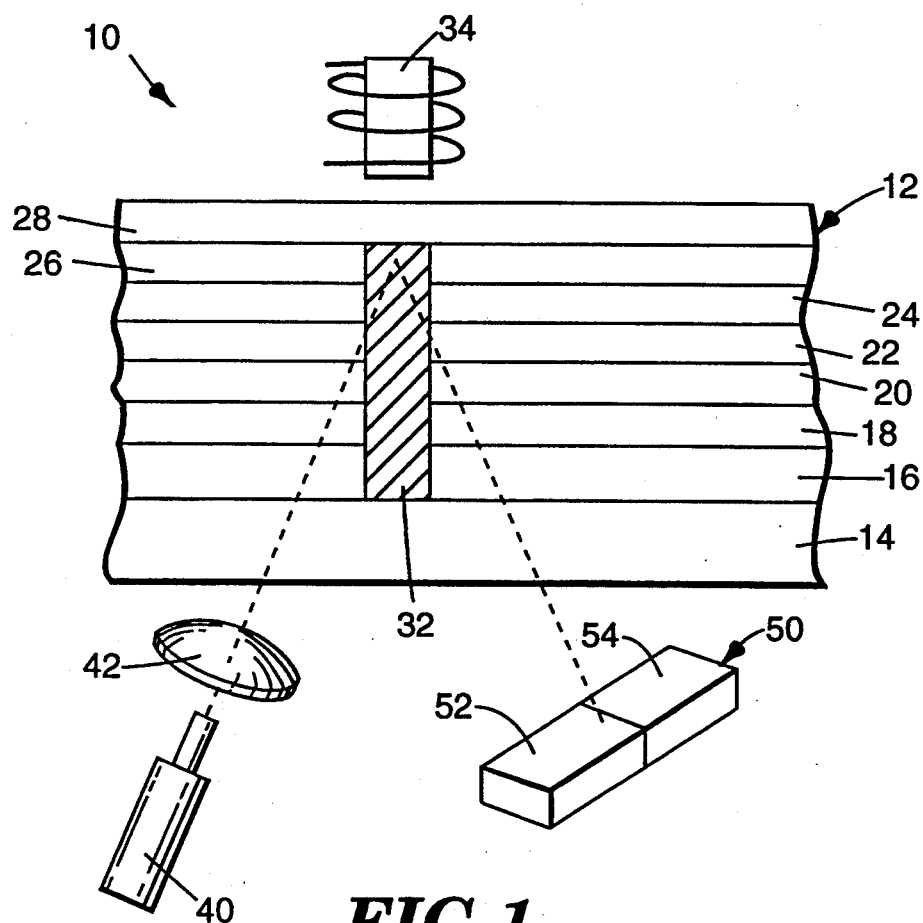
FIG.1
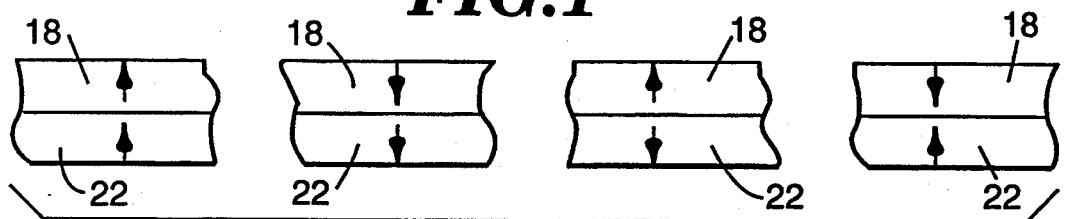
FIG.2
| | ↑↑ UP-UP | ↓↓ DOWN-DOWN | ↑↓ UP-DOWN | ↓↑ DOWN-UP |
|---|---|---|---|---|
| $\phi_1$ | $S_1$ | $S_2 = -S_1$ | 0 | 0 |
| $\phi_2$ | 0 | 0 | $S_3$ | $S_4 = -S_3$ |
| SIGNAL OUTPUT | $S_1$ | $S_2$ | $S_3$ | $S_4$ |
FIG.3

MAGNETO-OPTIC RECORDING MEDIUM HAVING TWO RECORDING LAYERS, AND DRIVE FOR SAME

FIELD OF THE INVENTION

The present invention relates generally to magneto-optic recording systems, and more particularly to magneto-optic recording systems for use with media having two magneto-optic recording layers.

BACKGROUND OF THE INVENTION

Magneto-optic recording systems comprise an optical read/write beam and a magnetizable storage medium, usually a disk. Writing is accomplished by a high intensity focused light beam, such as a laser, which alters the magnetization of the medium by heating a localized area of the medium above its Curie temperature and allowing the area to cool under an applied magnetic field. Reading is accomplished by a lower intensity plane-polarized beam which, upon transmission through and/or reflection from the medium, experiences a Kerr rotation in polarization through a characteristic angle $\theta$ or $-\theta$ depending on the local magnetization of the medium. Optical detectors may be used to translate the Kerr rotation angle into a binary data signal.

One method of increasing information storage on a magneto-optic medium is to increase the number of independent recording layers in the medium. The recording layers are designed to have different writing temperatures by varying their magnetic coercivity, $H_c$, and/or Curie temperature so that a different power laser write pulse will record on only one, two, or more layers.

This method, however, usually results in a diminished read signal from the magneto-optic medium, especially where, for example, the signal is measured by the reflected light (Kerr rotation, $\theta$). Thus, when individual layers are independently switched within the medium, the resulting magneto-optic signal is only a fraction of the signal typically received from single-layer media.

For example, a single-layer medium can be recorded in either an "up" state, where the magneto-optic layer is magnetized upward, or a "down" state, where the magneto-optic layer is magnetized in the opposite direction, giving rise to two possible states. If the "up" state has a magneto-optic (or Kerr) rotation of $+1°$, then the "down" state has a Kerr rotation of $-1°$, and the difference between the two states, i.e., the signal, is $2°$.

In the case of a two-layer medium, the magneto-optic layer can be recorded in three different states: "up-up," where both layers are aligned upward; "down-down," where both layers are aligned downward; and "up-down," wherein each layer is magnetized in the opposite direction. (Note that "up-down" is equivalent to "down-up" because in both cases the signals from the two layers cancel each other out.) Thus, the ability to utilize three magnetic states, instead of two for the single-layer medium, leads to an increase in storage density of 50%.

The increased storage density, however, has a drawback: decreased signal. If the up-up state has a magneto-optic rotation of $+1°$, and the down-down state has a rotation of $-1°$, then the difference between those two states is $2°$, just as it was for the single-layer magneto-optic medium. However, the difference between the up-up ($+1°$) or down-down ($-1°$) states and the up-down ($0°$) states is only $1°$, which is only half of the $2°$ separation of the single-layer magneto-optic medium. This results in a loss of signal of 6 dB.

SUMMARY OF THE INVENTION

The present invention includes a magneto-optic recording medium having a substrate and two magneto-optic layers. The Curie temperature of one of the two magneto-optic layers should be at least 30 C. greater than the Curie temperature of the other layer. The magneto-optic layers must be capable of existing in two different magnetic states: a first magnetic state in which both magneto-optic layers are magnetized in the same direction and second state in which the layers are magnetized in opposite directions. The phase, $\phi$, of the magneto-optic film stack is defined as the arctangent of the magneto-optic ellipticity, $\epsilon$, divided by the magneto-optic rotation, $\theta$; i.e., $=\tan^{-1}(\epsilon/\theta)$ for each magnetic state. The phase difference, $\Delta\phi$, for the two states should be about $90°$; i.e., $85° < \Delta\phi < 95°$. In one embodiment, the magneto-optic recording medium may be initialized in the second magnetic state.

In another embodiment, a dielectric layer is provided between the two magneto-optic layers and the magneto-optic layers include terbium-iron-cobalt. Each magneto-optic layer is preferably less than about 15 nm thick. A reflecting layer is preferably provided over the magneto-optic layer farthest from the substrate. Additional dielectric layers may be provided to separate the magneto-optic layers from the substrate and reflecting layer.

The magneto-optic layer nearer the substrate is preferably from about 7–12 nm thick, while the other magneto-optic layer is preferably about 6–10 nm thick. The difference in Curie temperatures between the two magneto-optic layers is preferably about $60°$ to $100°$ C. If the magneto-optic layers comprise terbium-iron-cobalt, one of the magneto-optic layers may comprise 0–8% cobalt while the other may comprise 8–16% cobalt.

The present invention also includes a magneto-optic drive for use with the medium described above. The drive includes a laser and a detector having two read channels. The laser is positioned to direct light toward the medium and the detector is positioned to receive the light as it exits the medium. The read channels are optically tuned to the phases, $\phi$, of the magnetic states.

In one preferred embodiment, the magnetic states of the medium are each further divided into two substates, so that the first state (both layers magnetized in same direction) may be upward (both layers magnetized upward, or "up-up") or downward (both layers magnetized downward, or "down-down"). Similarly, the second magnetic state (the layers magnetized in opposite directions) may be "up-down" or "down-up," depending on which of the layers are magnetized upward or downward. The first read channel receives a first signal, $S_1$, if the medium is up-up, and a second signal, $S_2$, if the medium is down-down. The record signal, $S_2$, is equal in magnitude but opposite in direction to $S_1$; i.e., $S_2 = -S_1$. The first read channel receives substantially no signal if the medium is in the up-down or down-up substates. Similarly, the second read channel receives a third signal, $S_3$, if the medium is up-down, and a fourth signal, $S_4$, if the medium is down-up. The fourth signal, $S_4$, is equal in magnitude but opposite in direction to $S_3$; i.e., $S_4 = -S_3$. The second read channel receives substantially no signal if the medium is in the up-up or down-down substates. The drive has calculating means for combining the signals from the two read channels to determine the magnetic substate of the medium.

BRIEF DESCRIPTION OF THE DRAWINGS

FIG. 1 shows a schematic view of a magneto-optic recording system according to the one embodiment of the present invention.

FIG. 2 shows a schematic diagram of the four magnetization substates according to the present invention for the medium shown in FIG. 1.

FIG. 3 shows a table of the signal outputs according to the present invention for the four magnetization substates shown in FIG. 2.

DETAILED DESCRIPTION

One embodiment of the present invention is shown schematically as magneto-optic recording system 10 in FIG. 1. System 10 includes magneto-optic recording medium 12, which comprises substrate 14, a first dielectric layer 16, a first magneto-optic recording layer 18, a second dielectric layer 20, a second magneto-optic layer 22, a third dielectric layer 24, a reflecting layer 26, and an optional protective layer 28. As shown in FIG. 1, a laser 40 directs a beam of light through lens 42 which focuses the beam to a point at bit 32, thereby heating the bit to the write temperature. Magnetic field source 34 provides a magnetic field sufficient to write bit 32. Laser 40 preferably also operates at a lower energy level for reading medium 12. During reading, the reflected beam is detected by detector 50.

Recording layers 18 and 22 are each capable of storing information. In order to be able to record on either layer 18 or 22, the two layers should have a Curie temperature that differs by at least about 30 C., and more preferably differs within the range of 60°–100° C. Correspondingly, laser 40 operates at a first energy level sufficient to heat first recording layer 18 to above its Curie temperature, $T_{C1}$, but insufficient to heat second recording layer 22 to its Curie temperature, $T_{C2}$. Laser 40 also operates at a second energy level sufficient to heat second recording layer 22 above its Curie temperature, $T_{C2}$.

Recording layers 18 and 22 can be magnetized in either the "up" direction or the "down" direction. As shown in FIG. 2, there are four possible variations: The first and second layers may be magnetized in the same direction, ("up-up") or ("down-down"), or in opposite directions ("down-up") or ("up-down").

Conventional magneto-optic drives measure only the magneto-optic rotation, $\theta$, of the magneto-optic layer. However, drive system 10 according to the present invention also measures the magneto-optic ellipticity, $\epsilon$, of the magneto-optic layers. This requires that magneto-optic medium 12 be designed not only to have a certain characteristic magneto-optic rotation, $\theta$, but also to have a certain characteristic magneto-optic ellipticity, $\epsilon$.

Detector 50 is designed to detect a specific ratio of magneto-optic ellipticity to rotation. This ratio can be specified in terms of the phase shift, $\phi$, as:

$$\phi = \tan^{-1}(\epsilon/\theta).$$

When the phase shift of the media is 90° different from that for which the read channel is optimized, the read amplitude is nearly zero. It is possible to take advantage of this insensitivity to signals with a 90° phase shift in order to multiplex data by using an additional read channel optimized for the 90° phase-shifted light.

Thus, detector 50 has two read channels 52 and 54 which are tuned to $\phi_1$ and $\phi_2$, respectively, where:

$$\phi_1 = \tan^{-1}(\epsilon_1/\theta_1),$$

wherein recording layers 18 and 22 are magnetized in the same direction;

$$\phi_2 = \tan^{-1}(\epsilon_2/\theta_2),$$

wherein recording layers 18 and 22 are magnetized in opposite directions; and $$85° < |\phi_2 - \phi_1| < 95°,$$

wherein $\phi_2$ and $\phi_1$ are about 90° out of phase.

As explained in the Background of the Invention section, a dual magneto-optic layer system will have poor CNR if it must detect three different values on a single channel. This is true because, typically, the first value, $V_1$, is positive, the second value, $V_2$, is negative ($V_2 = -V_1$), and the third value is 0, leading to signal difference between adjacent signals of $V_1$. In the case of a single-layer magneto-optic medium, the two signal values would be $V_1$ and $V_2$, where $V_2 = -V_1$, so that the signal difference would be $2V_1$.

The present invention avoids this loss in CNR by using two separate read channels. This allows each channel to carry only two signals, $S_1$ and $S_2 (= -S_1)$ on one channel ($\phi_1$) and $S_3$ and $S_4 (= -S_3)$ on the other channel ($\phi_2$). Thus, the magnitude of the difference in signal is $2S_1$, on $\phi_1$, and $2S_3$ on $\phi_2$.

As shown in FIG. 3, first read channel 52 is tuned to $\phi_1$, and detects a signal $S_1$ when recording layers 18 and 20 are magnetically aligned upward and a signal $S_2$ when the recording layers are aligned downward. Note that $S_1$ is equal in magnitude and opposite in direction to $S_1$. Thus, the difference in signal detected by $\phi_1$ is $2S_1$. Read channel $\phi_1$ is tuned so that no signal (or minimal signal) is detected if recording layers 18 and 22 have opposite magnetic orientations (up-down or down-up).

Read channel 54 is tuned to $\phi_2$ and detects a signal $S_3$ when first recording layer 18 is magnetically aligned upward and second recording layer 20 is aligned downward (up-down). Read channel 54 detects a signal $S_4$ when first recording layer 18 is magnetically aligned downward and second recording layer 22 is magnetically aligned upward (down-up). Note that $S_4$ is equal in magnitude and opposite in direction to $S_3$. Thus, the difference in signal detected by $\phi_2$ is $2S_3$. Read channel $\phi_2$ is tuned so that no signal (or minimal signal) is detected if recording layers 18 and 22 are both magnetically aligned in the same direction.

Substrate 14 is preferably transparent, has very low birefringence, and is nominally 1.2 mm thick. Suitable materials include glass, polycarbonate, polymethylmethacrylate, and amorphous polyolefin (APO).

Dielectric layers 16, 20, and 24 preferably have an index of refraction having a real component, n, between 1.5 and 3 and an imaginary component, K, less than 0.2. Dielectric layers 16, 20, and 24 may comprise silicon nitride (SiN), silicon carbide ($SiC_x$), silicon oxide ($SiO_x$), yttrium oxide ($YO_x$), aluminum nitride (AlN), silicon aluminum oxynitride (SiAlON), or similar materials. Dielectric layers 16, 20, and 24 preferably have thicknesses within the range of 10–150 nm.

Recording layers 18 and 22 preferably comprise a rare-earth transition metal alloy, such as terbium-iron-cobalt TbFeCo). The Curie temperature of recording layers 18 and 22 may be varied by changing the amount of cobalt present in the alloy.

Reflecting layer 26 preferably comprises aluminum or aluminum doped with chromium (AlCr$_{0.03}$) having a thickness within the range of 50 to 200 nm. As explained in the Background of the Invention, the addition of a second recording layer increases the storage capacity of the magneto-optic medium by just 50%, instead of doubling the capacity, because the Kerr rotation of the up-down configuration is the same as that for the down-up configuration (both of which are zero).

However, suppose that the medium is initialized in an up-down state so that the layer that is "down" has the lower recording power. This can be accomplished in any of a variety of ways. For example, the medium can be cooled below the compensation temperature of one recording layer and both recording layers can then be magnetized "down." By heating the medium back to room temperature, the magnetization of one of the recording layers would flip, resulting in an "up-down" initialized recording state. Alternatively, if the room temperature magnetic coercivities of the two layers were substantially different, a large magnetic field could be used to magnetize both recording layers in the same direction, and then a smaller magnetic field could be used to flip the magnetization direction of just one of the recording layers.

With the medium initialized in the up-down state, the entire medium may be recorded with a recording field in the "down" direction using a high laser power. This records bits in the standard manner in the "up" layer while leaving the "down" layer in the erased state, even though it is heated above its Curie temperature. After recording the entire medium (or perhaps just a single track), the magnetic polarity of the recording field is reversed. A lower laser power is then used to record bits in the standard manner in the "down" layer without affecting the recorded bits in the other recording layer, resulting in independent information being stored in the two layers. By using the two read channels, all four magnetic states (up-up, down-down, up-down, and down-up) can be read simultaneously.

The method of constructing medium 12 will now be illustrated by the following non-limiting computer-modelled example. (All measurements approximate.)

EXAMPLE

The thicknesses of the layers in medium 12 may be chosen by the use of computer-aided optical modeling. For example, let us begin with a medium 12 as shown in FIG. 1 wherein the dielectric layers are comprised of silicon carbide and the recording layers were comprised of terbium-iron-cobalt doped with tantalum (Tb$_{0.02}$Fe$_{0.69}$Co$_{0.10}$Ta$_{0.01}$). First dielectric layer 16 was 25 nm thick, second dielectric layer 20 was 47 nm thick, and third dielectric layer 24 was 52.5 nm thick. First recording layer 18 was 10 nm thick and second recording layer 22 was 7.5 nm thick. Reflecting layer 26 was 100 nm thick.

Optical modeling of the above optical stack indicates a reflectance of 28% and a relative phase shift between the up-up state and the up-down state of 59°. We would like to increase this phase difference, $\Delta\phi$, to about 90°. Optical modeling indicates that increasing the thickness of the dielectric layer causes the reflectance to decrease but has no significant effect on the relative phase shift difference, $\Delta\phi$. Therefore, the thickness of this layer may be adjusted to control the reflectance of the film stack.

Decreasing the thickness of the first recording layer causes a decrease in reflectance and an increase in $\Delta\phi$. However, A,b never reaches 90°, even for thicknesses as low as 2 nm. Increasing the second dielectric layer from zero thickness causes the reflectance to increase, while the phase shift $\Delta\phi$, at first increases and then rapidly decreases. The maximum $\Delta\phi$ occurs for a thickness slightly less than 47 nm, but again does not reach 90°. Increasing the thickness of the second recording layer from zero causes the reflectance to drop and $\Delta\phi$ to increase first and then decrease, Again, $\Delta\phi$ never reaches 90°. Finally, increasing the thickness of the third dielectric layer increases the reflectance until a thickness of about 50 nm is reached. The phase shift, $\Delta\phi$, however, increases dramatically with increasing thickness and does not saturate. By changing the thickness of this layer, optical modeling suggests that any $\Delta\phi$ can be obtained. Clearly, this is the layer to vary first to obtain the desired 90° $\Delta\phi$, before adjusting the first dielectric layer for desired reflectance.

Following the above procedure, the third dielectric layer was adjusted to 62 nm for the desired $\Delta\phi$. Next, the first dielectric thickness was adjusted to 32.5 nm to obtain the desired film stack reflectance of 24%. The final optical model suggests that $\Delta\phi = 89.5°$.

In practice, the optical model is a good approximation to an experimentally produced sample, but is not expected to be exact. Therefore, once an optical model has given a good starting point optical film stack, actual samples should be prepared and the thickness of the individual layers further iterated experimentally according to the procezlure derived from the optical modeling. Of course, the actual samples that are prepared should have recording layers having Curie temperatures which differ by at least 30 C. and more preferably 60 to 100 C., as described above.

I claim:

1. A magneto-optic recording medium, comprising, in order:
   a substrate;
   a first magneto-optic layer characterized by a first Curie temperature, $T_{c1}$;
   a second magneto-optic layer characterized by a second Curie temperature, $T_{c2}$, wherein $|T_{c2} - T_{c1}| > 30°$ C.;
   such that the magneto-optic layers exist in one of two magnetic states as follows:
   a first magnetic state wherein the magneto-optic layers are magnetized in the same direction, the first state characterized by a first magneto-optic rotation, $\theta_1$, a first magneto-optic ellipticity, $\epsilon_1$, and a first phase shift, $\phi_1$, wherein $\phi_1 = \tan^{-1}(\epsilon_1/\theta_1)$; and
   a second magnetic state wherein the magneto-optic layers are magnetized in opposite directions, the second state characterized by a second magneto-optic rotation, $\theta_2$, a second magneto-optic ellipticity, $\epsilon_2$, and a second phase shift, $\phi_2$, wherein $\phi_2 = \tan^{-1}(\epsilon_2/\theta_2)$ wherein $85° < |\phi_2 - \phi_1| < 95°$.

2. The medium of claim 1, further comprising a dielectric layer provided between the two magneto-optic layers.

3. The medium of claim 2, wherein the magneto-optic layers comprise terbium-iron-cobalt.

4. The medium of claim 2, wherein each magneto-optic layer is less than 15 nm thick.

5. The medium of claim 4, further comprising a reflecting layer positioned adjacent a side of the second magneto-optic layer opposite the substrate.

6. The medium of claim 5, further comprising a second dielectric layer provided between the substrate and the first magneto-optic layer, and further comprising a third dielectric layer positioned between the second magneto-optic layer and the reflecting layer.

7. The medium of claim 6, wherein the first magneto-optic layer is about 7 to 12 nm thick, the second magneto-optic layer is about 6 to 10 nm thick.

8. The medium of claim 2, wherein $60\ C. < |T_{c2} - T_{c1}| < 100\ C.$

9. The medium of claim 8, wherein the magneto-optic layers comprise terbium-iron-cobalt, and wherein one of the magneto-optic layers comprises 0 to 8% cobalt and the other magneto-optic layer comprises 8 to 16%.

10. The medium of claim 1, wherein the medium is initialized in the second magnetic state.

11. A magneto-optic drive comprising:
a laser positioned to direct a beam of light toward a magneto-optic recording medium; and
a detector for receiving light from the laser exiting the recording medium, the detector comprising:
a first read channel optically tuned to measure the magneto-optic rotation, $\theta_1$, and ellipticity, $\epsilon_1$, of a recorded bit in a first magnetic state characterized by a first phase shift, $\phi_1$, wherein $\phi_1 = \tan^{-1}(\epsilon_1/\theta_1)$;
a second read channel optically tuned to a second phase shift, $\phi_2$, wherein $85° | < \phi_2 - \phi_1 | < 95°$.

12. A magneto-optic drive for use with a magneto-optic recording medium, the medium comprising:
a substrate;
a first magneto-optic layer characterized by a first Curie temperature, $T_{c1}$; and
a second magneto-optic layer characterized by a second Curie temperature, $T_{c2}$, wherein $|T_{c2} - T_{c1}| > 30\ C.$;
such that the magneto-optic layers exist in one of two magnetic states as follows:
a first magnetic state wherein the magneto-optic layers are magnetized in the same direction, the first state characterized by a first magneto-optic rotation, $\theta_1$, a first magneto-optic ellipticity, $\epsilon_1$, and a first phase shift, $\phi_1$, wherein $\phi_1 = \tan^{-1}(\epsilon_1/\phi_1)$; and
a second magnetic state wherein the magneto-optic layers are magnetized in opposite directions, the second state characterized by a second magneto-optic rotation, $\theta_2$, a second magneto-optic ellipticity, $\epsilon_2$, and a second phase shift, $\phi_2$, wherein $\phi_2 = \tan^{-1}(\epsilon_2/\theta_2)$, wherein $85° < |\phi_2 - \phi_1| < 95°$;
wherein the magneto-optic drive comprises:
a laser positioned to direct a beam of light toward the medium; and
a detector for receiving light from the laser exiting the medium, the detector comprising a first read channel optically tuned to $\phi_1$ and a second read channel optically tuned to $\phi_2$.

13. The drive of claim 12, wherein the first magnetic state further comprises two substates: a first substate in which the first and second magneto-optic layers are both magnetized upward ("up-up"), and a second substate in which the magneto-optic layers are both magnetized downward ("down-down"), and wherein the second magnetic state further comprises two substates: a third substate in which the first magneto-optic layer is magnetized upward and the second magneto-optic layer is magnetized downward ("up-down"), and a fourth substate in which the first magneto-optic layer is magnetized downward and the second magneto-optic layer is magnetized upward ("down-up"), wherein:
the first read channel receives a first signal, $S_1$, if the medium is in the first substate, and receives a second signal, $S_2$, where $S_2 = -S_1$, if the medium is in the second substate, and receives substantially no signal if the medium is in the third or fourth substates; and
the second read channel receives a third signal, $S_3$, if the medium is in the third substate, and receives a fourth signal, $S_4$, where $S_4 = -S_3$, if the medium is in the fourth substate, and receives no signal if the medium is in the first or second substate;
and wherein the drive further comprises calculating means for combining the signals from the first and second read channels to determine the magnetic substate of the medium.

* * * * *

UNITED STATES PATENT AND TRADEMARK OFFICE
CERTIFICATE OF CORRECTION

PATENT NO. : 5,414,678
DATED : May 9, 1995
INVENTOR(S) : Challener, IV

It is certified that error appears in the above-indentified patent and that said Letters Patent is hereby corrected as shown below:

On title page, item [56], under OTHER PUBLICATIONS, column 2, line 6, "Storgae" should read --Storage--.

In column 1, line 54, "each. layer" should read --each layer--.

In column 5, line 3, "cobalt TbFeCo)" should read --cobalt (TbFeCo)--.

In column 6, line 7, "A,b" should read --$\Delta\phi$--.

In column 6, line 36, "procezlure" should read --procedure--.

Signed and Sealed this

Fifth Day of December, 1995

Attest:

BRUCE LEHMAN

Attesting Officer

Commissioner of Patents and Trademarks